Figure 1:
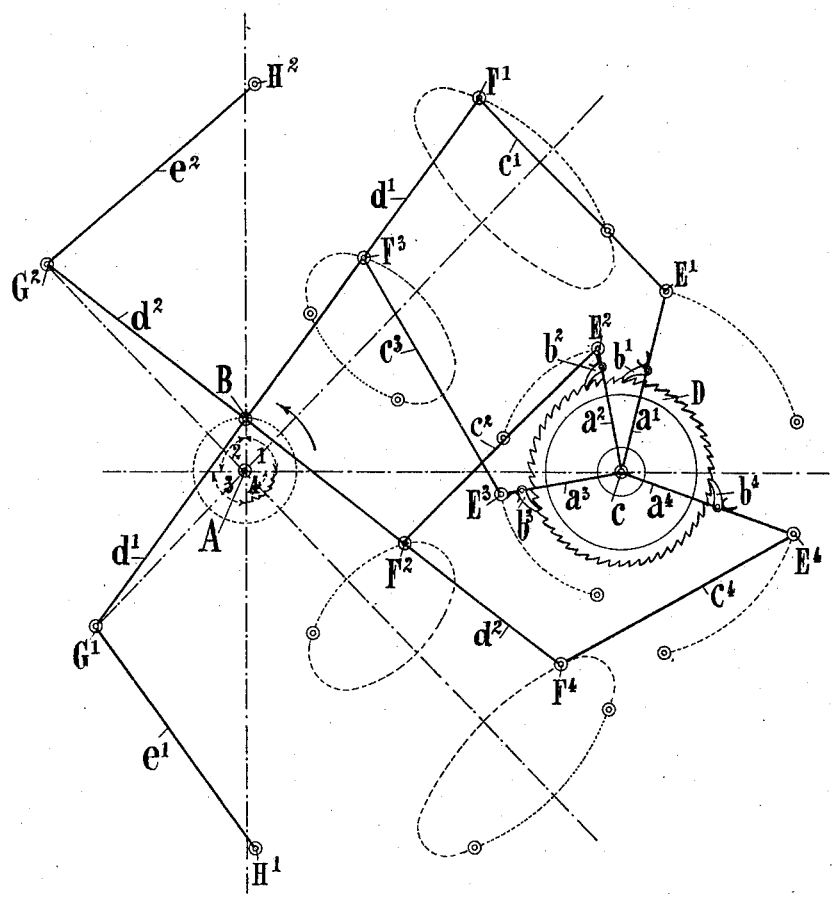

G. E. CAUDERAY & J. C. CHAUVE.
VARIABLE SPEED POWER TRANSMISSION DEVICE.
APPLICATION FILED DEC. 17, 1909.

998,277.

Patented July 18, 1911.

2 SHEETS—SHEET 1.

G. E. CAUDERAY & J. C. CHAUVE.
VARIABLE SPEED POWER TRANSMISSION DEVICE.
APPLICATION FILED DEC. 17, 1909.
998,277.
Patented July 18, 1911.
2 SHEETS—SHEET 2.
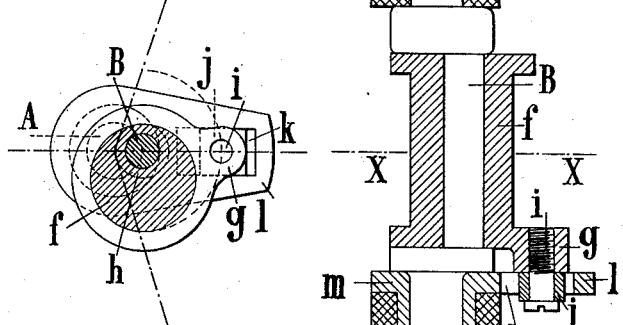
Fig. 2.
Fig. 3.
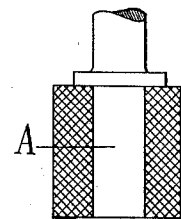
Fig. 4.
Fig. 5.
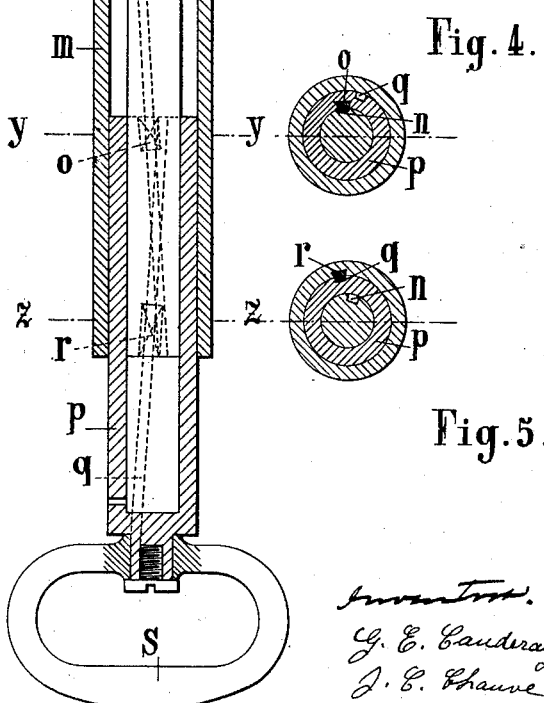

UNITED STATES PATENT OFFICE.

GEORGES EDOUARD CAUDERAY AND JEAN CHARLES CHAUVE, OF PARIS, FRANCE.

VARIABLE-SPEED POWER-TRANSMISSION DEVICE.

998,277.  Specification of Letters Patent.  Patented July 18, 1911.

Application filed December 17, 1909. Serial No. 533,622.

*To all whom it may concern:*

Be it known that we, GEORGES EDOUARD CAUDERAY and JEAN CHARLES CHAUVE, of Paris, France, having invented certain new and useful Improvements in Variable-Speed Power-Transmission Devices, do hereby declare the nature of our invention and in what manner the same is to be performed to be particularly described and ascertained in and by the following statement.

The present invention relates to a device for transmitting a motion of rotation, in which the driving shaft transmits a constant angular speed to the driven shaft and which can be used as a progressive speed changing gear.

Our invention relates to a lever combination which insures transmission to the driven shaft of a constant angular speed.

In the accompanying drawing: Figure 1 is a diagrammatic view. Fig. 2 is a sectional view. Fig. 3 is a section on the line $x$—$x$ in the Fig. 2. Figs. 4 and 5 are respectively sections on the lines Y—Y and Z—Z of Fig. 2.

It being supposed that we have a main shaft A provided with a crank-stud B, Fig. 1, we have to transmit, unintermittingly and without jerks, the motion of rotation of this crank-stud to a shaft C on which is keyed a ratchet-wheel D. On the shaft C are freely mounted four main levers $(a^1)$, $(a^2)$, $(a^3)$, $(a^4)$, each of said levers bearing one of the pawls $(b^1)$, $(b^2)$, $(b^3)$ and $(b^4)$. Four connecting rods $(c^1)$, $(c^2)$, $(c^3)$, and $(c^4)$ connect respectively the points $E^1$ $E^2$ $E^3$ and $E^4$ of the four levers $(a^1)$, $(a^2)$, $(a^3)$, and $(a^4)$, to the points $F^1$, $F^2$, $F^3$ and $F^4$ of the two working beams $(d^1)$ and $(d^2)$, both of said beams mounted on the crank-stud B and which are connected at their ends $G^1$ and $G^2$ through two connecting rods $(e^1)$ and $(e^2)$ to two fixed points $H^1$ and $H^2$.

In order to obtain with this device angular displacements of the shaft C at any moment proportional to the angular displacements of the crank-stud B, it is only necessary to conveniently calculate the position of the steady points or fulcrums, the length of the connecting rods and the distance of the fastening points of the said connecting rods. As herein illustrated, the fulcrums $H^1$ and $H^2$ are symmetrically disposed to the line A C, and all the members connected to the point $H^1$ are respectively equal to the corresponding members connected to the point $H^2$. The four connecting rods $(c^1)$, $(c^2)$, $(c^3)$ and $(c^4)$ are equal. These essential conditions being obtained if the curves described by the points $F^1$, $F^2$, $F^3$ and $F^4$ are traced out during a revolution of the crank stud (B), if the said revolution is divided into four sectors of 90° each, by a line perpendicular to the line A, C, and if the said sectors are numbered from 1 to 4 beginning at the line A C, it will be noted that when the crank-stud B is displaced in the sector 1, the points $F^1$ and $E^1$ describe simultaneously two parts of curves very nearly parallel and of an equal length, and during this sector, the angular speed of the point $E^1$ may be in fact considered as being at any moment proportional to the angular speed of the point B.

During the sector 2, the part of the curve described by the point $F^2$ may in the same manner be considered as parallel and equal to the part of curve described by the point $E^2$, and during this sector the angular speed of the point $E^2$ may be also considered as being at any moment proportional to the speed of the stud B.

It will be noted that the equations above mentioned being observed, the angle described by the point $E^2$ during the sector 2 will be the same as the angle described by the point $E^1$ during the sector 1.

During the sectors 3 and 4, the points $F^3$ and $F^4$ will be displaced respectively as the points $F^2$ and $F^1$.

It will thus be seen that by the intervention of the pawls $(b^1)$, $(b^2)$, $(b^3)$ and $(b^4)$ the crank-stud (B) drives the ratchet wheel D in a continuous manner, without shakes, without jerks, and with a constant angular speed.

When the crank stud B performs a revolution in the direction of the arrow, the pawl ($b^1$) pushes the ratchet wheel during the sector 1; at the moment the stud B reaches the vertical line, that is to say the position shown in Fig. 1, the pawl ($b^1$) is operative, but the pawl ($b^2$) is already engaged and will drive the wheel while the stud B describes the sector 2. The pawl ($b^3$) now takes the place of the pawl ($b^2$) and the pawl ($b^4$) will terminate the revolution taking the place of the pawl ($b^3$) and finally the pawl ($b^1$) takes its place.

It will thus be seen that during a complete revolution of the stud B around A, the ratchet wheel D will be constantly driven by one pawl and that the angular speed of the said ratchet wheel will be at any moment according to a constant relation with the angular speed of the stud B. It is obvious that the relation of the two speeds of the main shaft and of the driven shaft is varied with the diameter of the circumference described by the stud B. It will thus only be necessary to vary the diameter in a progressive manner to be able to use this mode of transmitting of the motion as a progressive speed changing gear.

Figs. 2 to 5 show one arrangement that permits of placing the stud B near the center A of the main shaft and removing it from the same. On the crank B of the shaft A, Figs. 2 and 3 is placed an eccentric ($f$) having an ear ($g$). On the said eccentric will be mounted the working beams ($d'$) and ($d^2$); Fig. 1, and the center of the eccentric takes the place of the stud B. If, therefore, the said eccentric is turned around the stud B, the point ($h$) the axis of the eccentric ($f$) will come near the center A and will go away from it, describing a semi-circumference. In order to attain this result, the ear ($g$) of the eccentric has an axis ($i$) on which is mounted a slide ($j$) which may be moved in a mortise ($k$) in an arm ($l$) which is a part of a sheath ($m$) mounted on the shaft A. To vary the place of the eccentric, it will be only necessary to change the relative position of the sheath ($m$) with the shaft A. The shaft A bears a helicoidal groove, with a furrow ($n$), in which runs a key ($o$) making a part of a tube ($p$) which can be moved between the shaft A and the sheath ($m$). The tube ($p$) has a helicoidal groove ($q$) having its furrow in an opposite direction to the direction of the groove ($n$) of the shaft A; that is to say that if the groove ($n$) is made with a furrow to the right, the groove ($q$) is made with a furrow to the left. In the said groove ($q$) a key ($r$) made of part of the sheath ($m$) may slide, the tube ($p$) being able to turn freely in a driving device shown in the Fig. 2 by the handle ($s$); it will be understood that when the handle ($s$) is pushed or drawn, the shaft is made fast or loose within its sheath and therefore also the freeing of the eccentric is obtained, and at any position of the handle there will be a different wedging and consequently a different speed of the shaft C. It is obvious that the handle ($s$) may be replaced by any proper device (main lever, rack, screw, sector and the like), as may be desired.

Upon reference to Fig. 1 it will be seen that when the stud B moves toward position B, the speed of the shaft C will increase up to a maximum which will be reached in the position shown in the Fig. 1.

In order to obtain a reverse movement, it is only necessary to have on the shaft C a second ratchet wheel having its teeth in the contrary direction, and to dispose on each one of the levers ($a'$), ($a^2$), ($a^3$) and ($a^4$) a second pawl in the opposite direction, the action of which would be subject to the actions of the pawls ($b'$), ($b^2$), ($b^3$) and ($b^4$).

In the example given to make clear the description, we have made the supposition that the shaft C was driven through ordinary pawls. It is obvious that this mode of driving may be replaced by any other proper device, wedging device and the like.

Having now particularly described and ascertained the nature of our invention and in what manner the same is to be performed, we declare what we claim is:

1. A variable speed power transmission device comprising a main shaft provided with a crank stud, a shaft, a ratchet wheel keyed thereon, levers mounted freely on the last named shaft and radiating therefrom, a pawl carried by each lever and engaging said ratchet a connecting rod from each of said levers, and working beams with each of which two of said rods connect, said working beams intersecting each other and being mounted on said crank stud of the main shaft.

2. A variable speed power transmission device comprising a main shaft provided with a crank stud, a shaft, a ratchet wheel keyed thereon, levers mounted freely on the last named shaft, and radiating therefrom, a pawl carried by each lever and engaging said ratchet, a connecting rod from each of said levers, and working beams with each of which two of said rods connect, said working beams intersecting each other and being mounted on said crank stud of the main shaft, the points of connection of two of said rods being at the ends of said working beams.

3. A variable speed power transmission device comprising a main shaft provided with a crank stud, a shaft, a ratchet wheel keyed thereon, four levers mounted freely on the last named shaft and radiating therefrom, a pawl carried by each lever and engaging said ratchet, a connecting rod from each of said levers, working beams with each of which two of said rods connect, said working beams intersecting each other and being mounted on said crank stud of the main shaft, the points of connection of two of said rods being at the ends of said working beams, an eccentric on the stud of the main shaft and a slide block movable in a mortise thereon.

In witness whereof we have hereunto set our hands in presence of two witnesses.

GEORGES EDOUARD CAUDERAY.
JEAN CHARLES CHAUVE.

Witnesses:
MARCEL VANDERTTEYM,
H. C. COXE.

Copies of this patent may be obtained for five cents each, by addressing the "Commissioner of Patents, Washington, D. C."